United States Patent [19]
Shiga et al.

[11] Patent Number: 5,312,208
[45] Date of Patent: May 17, 1994

[54] BURNISHING DRILL

[75] Inventors: Kiyotaka Shiga; Nobuya Matsushita; Akio Fukui; Tsunehisa Yamashita; Manabu Shimizu, all of Toyota, Japan

[73] Assignee: Fuji Seiko Corporation, Toyota, Japan

[21] Appl. No.: 931,323

[22] Filed: Aug. 18, 1992

[30] Foreign Application Priority Data

Apr. 28, 1992 [JP] Japan ................... 4-110118

[51] Int. Cl.⁵ ............................................ B23B 51/02
[52] U.S. Cl. ................................... 408/224; 408/227
[58] Field of Search ............ 408/223, 224, 225, 227, 408/229

[56] References Cited

U.S. PATENT DOCUMENTS

| | | | |
|---|---|---|---|
| 1,000,067 | 8/1911 | Bennett | 408/224 |
| 1,514,704 | 11/1924 | Jack | 408/229 |
| 2,063,753 | 12/1936 | Pohlman | 408/229 |
| 2,479,136 | 8/1949 | Schade | 408/223 |
| 4,936,721 | 6/1990 | Meyer | 408/224 |
| 4,944,640 | 7/1990 | Suzuki et al. | 408/211 |
| 5,071,294 | 12/1991 | Suzuki et al. | 408/224 |
| 5,112,167 | 5/1992 | Shiga et al. | 408/211 |

FOREIGN PATENT DOCUMENTS

| | | |
|---|---|---|
| 7708833 | 6/1977 | Fed. Rep. of Germany . |
| 930936 | 7/1990 | Fed. Rep. of Germany . |
| 3923754 | 7/1990 | Fed. Rep. of Germany . |
| 59-47119 | 3/1984 | Japan . |
| 52490 | 1/1967 | Poland ................... 408/223 |
| 965644 | 10/1982 | U.S.S.R. . |
| 1281350 | 1/1987 | U.S.S.R. ................... 408/227 |
| 1673323 | 8/1991 | U.S.S.R. . |

OTHER PUBLICATIONS

Rubenshtein et al, "Precision Cemented-Carbide Reamers", Machines and Tooling, (1973), vol. XLIV, No. 2, pp. 40-42.
Patent Abstracts of Japan, vol. 5, No. 187 (M-98) Nov. 1981 re: JP 56-107814.
Patent Abstracts of Japan, vol. 10, No. 277 (M-519) Sep. 1986 re: JP 61-100306.

Primary Examiner—Daniel W. Howell
Attorney, Agent, or Firm—Cushman, Darby & Cushman

[57] ABSTRACT

A burnishing drill includes a cylindrical shank and a drill body connected to the shank. Drilling edges, first reaming edges and second reaming edges are formed on a first reduced diameter portion, a second reduced-diameter portion and a third reduced-diameter portion respectively located at a foremost end of the drill body. Each of the reaming edges is inclined with respect to the longitudinal axis of the drill at an angle which is set so as to be within a range of between 5° and 30°. During a boring operation using the drill, a hole is drilled by the drilling edges and the drilled hole is then worked by the first reaming edges and the second reaming edges to provide a smooth inner wall in the drilled hole. Since each of the reaming edges is formed to extend radially outward from the foremost end of the drill and incline axially in the rearward direction at a relatively small angle, the centering property can be greatly improved.

11 Claims, 11 Drawing Sheets

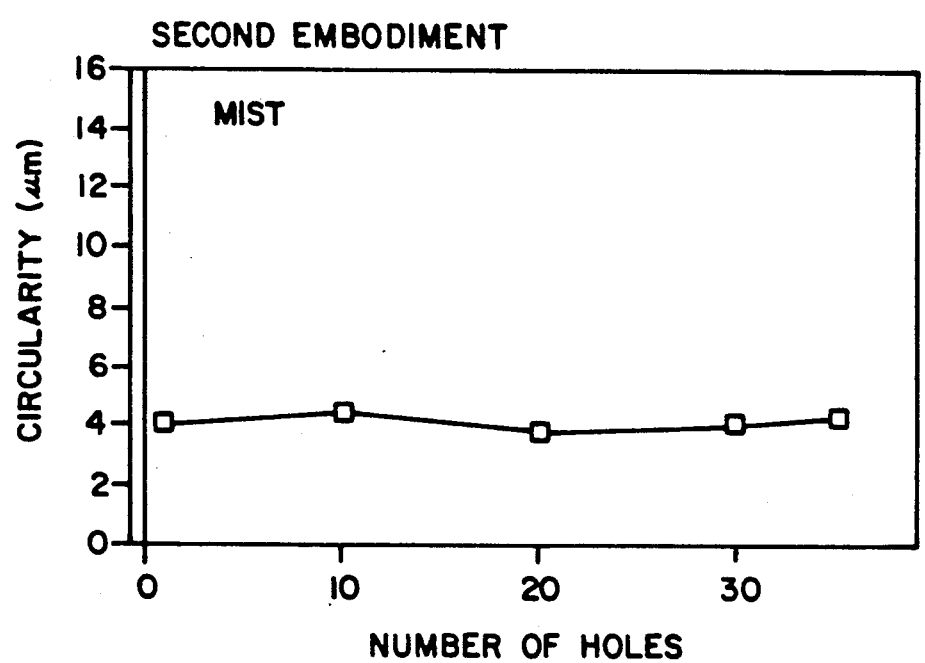

BURNISHING DRILL

BACKGROUND OF THE INVENTION

The present invention relates to a burnishing drill providing both drilling and reaming functions.

There are known various types of burnishing drills which have drilling edges and reaming edges and are adapted to form a hole in a workpiece made of a material such as cast iron. The workpiece is first drilled by the drilling edges which are made of hard metal. The drilled hole is further worked by the reaming edges which have an external diameter that is slightly larger than that of the drilling edges, to provide a relatively smooth inner wall for the finished hole. The reaming edges are located at a shoulder portion of the drill, extend radially outward from the foremost end of the drill and incline axially in the rearward direction. The inclined angle of the reaming edges is generally set within a range of between 35° and 45°.

When forming holes of the same size, such burnishing drills often cause dispersion of diameter, surface roughness and circularity of the finished holes. Especially when the feed speed of the drill is relatively high, these burnishing drills tend to provide an inaccurately finished side wall for the drilled hole, because the burnishing drills do not have good centering properties.

SUMMARY OF THE INVENTION

An object of this invention is to solve such problems by the provision of a burnishing drill which is capable of forming an accurately and smoothly finished hole, thereby improving the centering and stabilizing properties.

To this end, the present invention provides a burnishing drill comprising a shank and a drill body connected at one end of the shank. A first pair of cutting edge means extend radially outward from the foremost end of the drill and inclines axially in the rearward direction with a first cutting angle. A second pair of cutting edge means is disposed in a plane intersecting the plane which includes the longitudinal axis of the drill and the first cutting edge means. The second cutting edge means has its maximum external diameter larger than the external diameter of the first cutting edge means, extends radially outward from the foremost end of the drill and inclines axially in the rearward direction with a second cutting angle. The second cutting angle of is set within a range of between 5° and 30° with respect to the drill axis. The burnishing drill may include the first and second pair of cutting edge means having maximum external diameters smaller than the external diameter of said drill body.

Therefore, a workpiece is drilled by the first cutting edge means, and the drilled hole is further worked by the second cutting edge means to provide a smooth inner wall. Since the second cutting edge means extend radially outward from the foremost end of the drill and incline axially in the rearward direction at a relatively small angle, the concentricity upon drilling can be improved and the amount of oversize of the hole diameter can be reduced.

BRIEF DESCRIPTION OF THE DRAWINGS

Embodiments of the invention will now be described, with reference to the accompanying drawings, in which:

FIG. 19 is a characteristic diagram showing dispersion of circularity of the holes drilled and reamed by the burnishing drill of the second embodiment of the invention.

DETAILED DESCRIPTION OF PREFERRED EMBODIMENTS OF THE INVENTION

The first embodiment of the invention is illustrated in FIGS. 1 to 5.

Figure 2:
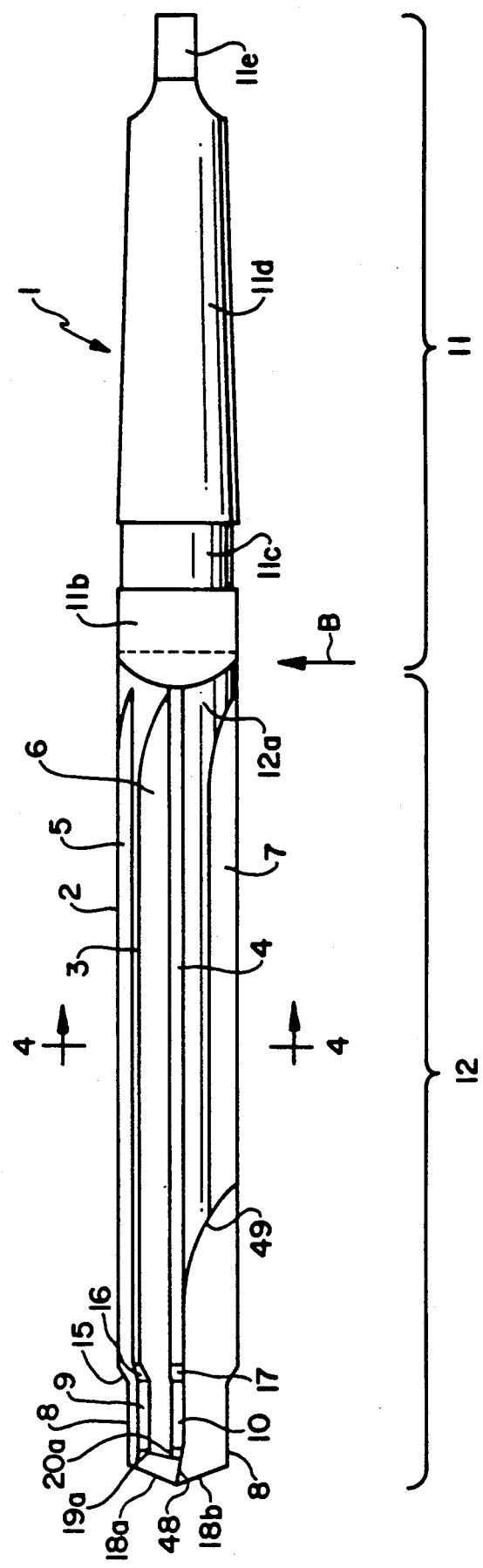
FIG. 2 is a side view illustrating the first embodiment of the invention.
Figure 3:
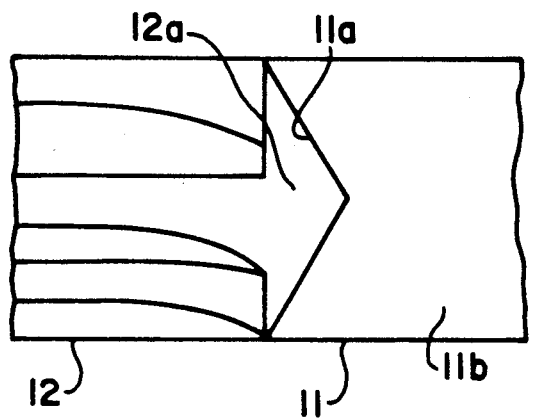
FIG. 3 is an enlarged partial view of the burnishing drill shown in FIG. 2 as viewed in the direction of arrow B therein.

As illustrated in FIG. 2, the burnishing drill adapted to bore a hole in a workpiece made of a material such as cast iron comprises a cylindrical shank 11 made of a material such as tool steel and a drill body 12 made of hard metal integrally connected with the shank. As shown in FIG. 3, the drill body 12 has a V-shaped end 12a on the side of the shank 11. The end 12a is brazed into a groove 11a located at a connection portion 11b of the shank 11. The connection portion 11b is connected to a base 11d and a tongue 11e by a reduced-diameter portion 11c.

Figure 4:
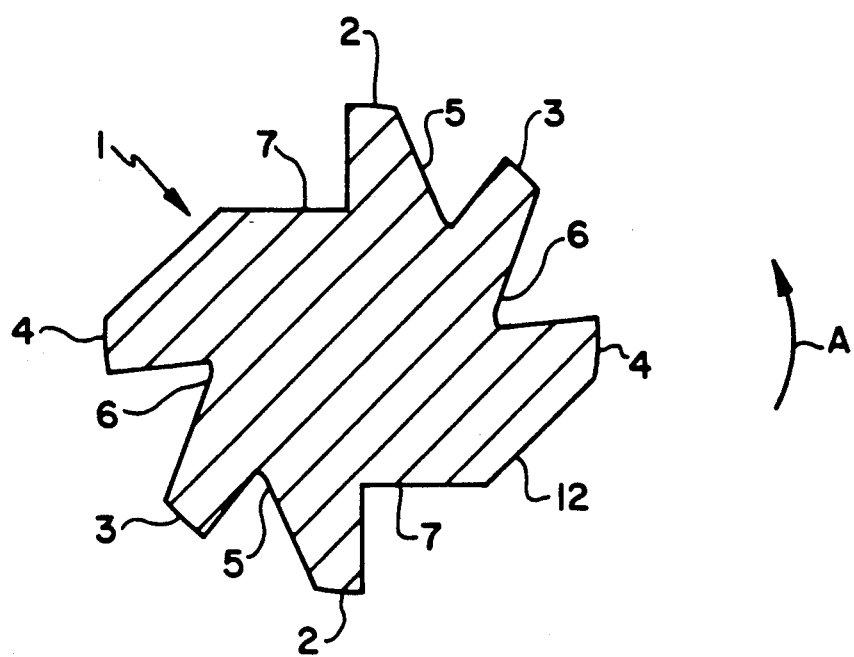
FIG. 4 is a sectional view of the burnishing drill taken on line 4—4 shown in FIG. 2.

As shown in FIGS. 2 and 4, the drill body 12 comprises a first pair of lands 2 axially extending toward the shank 11, a second pair of lands 3 which are offset relative to the first pair of lands 2 by 45° in the direction opposite to the rotational direction shown by arrow A in FIG. 4, and a third pair of lands 4 which are offset relative to the second pair of lands 3 by 45° in the direction opposite to the rotational direction shown by arrow A in FIG. 4. There are provided relief grooves 5, 6 and 7 between the lands 2, the lands 3 and the lands 4, which extend axially from the foremost end of the drill body 12 to the other end 12a. Chips are released outside through the relief grooves 5, 6 and 7.

A first reduced-diameter portion 8 having its external diameter smaller than that of the first lands 2 extends from a step portion 15 toward the foremost end of the drill body 12. A second reduced-diameter portion 9 having its external diameter smaller than that of the second lands 3 extends from a step portion 16 toward the foremost end of the drill body 12. And a third reduced-diameter portion 10 having its external diameter smaller than that of the third lands 4 extends from a step portion 17 toward the foremost end of the drill body 12. The second reduced-diameter portion 9 and the third reduced-diameter 10 respectively have diameters of the same size as one another. The first reduced-diameter portion 8 has its external diameter slightly larger than that of the second and third reduced-diameter portions. The step portion 15 is formed at a position axially nearer to the foremost end of the drill than the step portions 16 and 17, and has a pair of chamfering edges 15a at a forward position with respect to the rotational direction of the drill.

Figure 1:
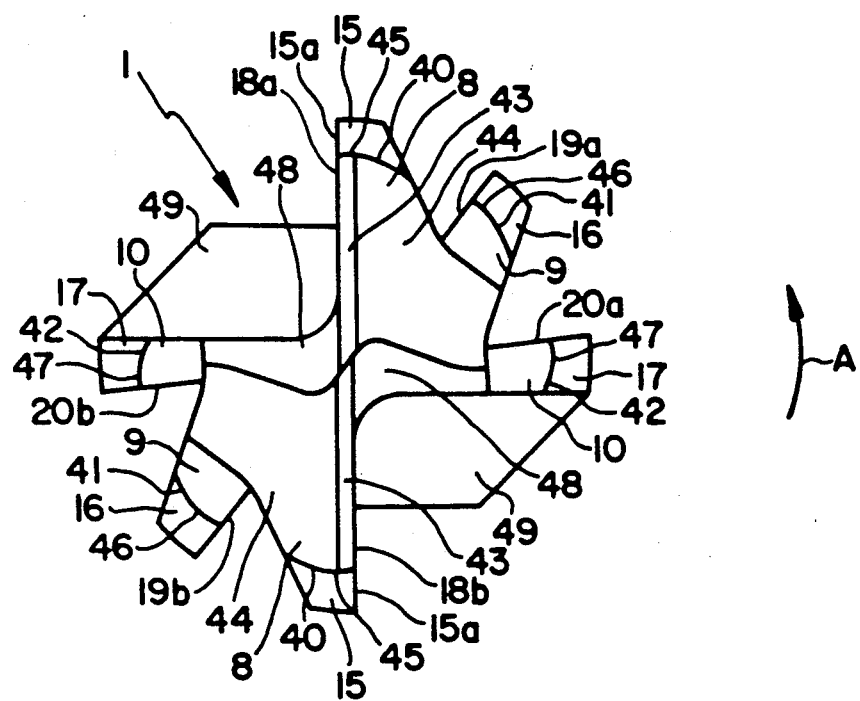
FIG. 1 is a front view illustrating a first embodiment of the invention.

As shown in FIG. 1, drilling edges 18a and 18b, first reaming edges 19a and 19b, and second reaming edges 20a and 20b, which extend radially outward from the foremost end of the drill and incline axially in the rearward direction, are provided at the foremost ends of the first reduced-diameter portion 8, the second reduced-diameter portion 9 and the third reduced-diameter portion 10, respectively.

Figure 5:
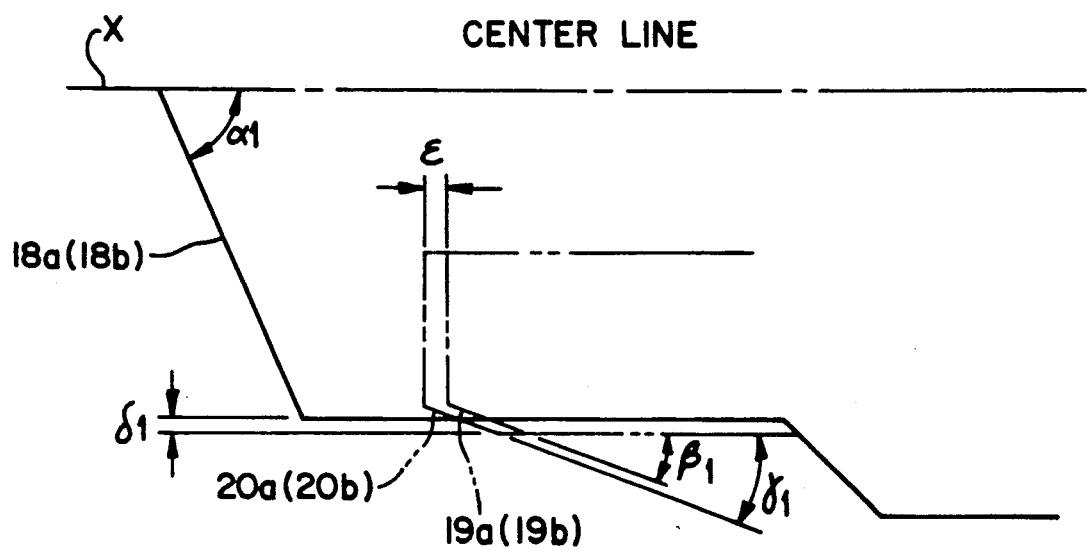
FIG. 5 is a schematic view illustrating the cutting angles of the drilling edges and the reaming edges of the first embodiment of the invention.

As shown in FIG. 5, each of the drilling edges 18a and 18b has a cutting angle $\alpha_1$ with respect to the drill axis X, so as to have a good initial bite. This cutting angle $\alpha_1$ is set within a range of between 60° and 90°. Each of the first reaming edges 19a and 19b has a cutting angle $\beta_1$ and each of the second reaming edges 20a and 20b has a cutting angle $\gamma_1$ so as to improve the centering property. These cutting angles $\beta_1$ and $\gamma_1$ are set within a range of between 5° and 30°. Preferably, both of the cutting angles $\beta_1$ and $\gamma_1$ are set to the same angle, such as 20°.

If the cutting angles $\beta_1$ and $\gamma_1$ are smaller than 5°, it will be found that the reaming edges tend to become longer and have difficulty in forming relatively short holes with a uniform diameter. If the cutting angles $\beta_1$ and $\gamma_1$ are larger than 30°, it will be found that the load per given length of the reaming edges becomes larger and this often results in a decrease in the centering property.

As shown in FIG. 5, the outermost ends of the first reaming edges 19a and 19b, and the second reaming edges 20a and 20b extend radially outward from the outermost ends of the drilling edges 18a and 18b by a distance $\delta_1$. In such a manner, the first reaming edges 19a and 19b and the second reaming edges 20a and 20b can ream a hole with relatively accurate hole diameter, surface roughness and circularity.

In addition, the second reaming edges 20a and 20b are located axially nearer to the drilling edges 18a and 18b by a distance $\epsilon$ than the first reaming edges 19a and 19b. Therefore, the first reaming edges 19a and 19b and the second reaming edges 20a and 20b receive a relatively uniform load on cutting. This results in lengthened service life of the drill. The distance $\epsilon$ can be varied according to the feed speed of the drill.

As shown in FIG. 1, the drill body 1 further comprises a first slope 43 and a second slope 44 formed at a backward position of the drilling edges 18a and 18b with respect to the rotational direction and inclined radially toward the shank 11. A first relief surface 48 is formed in the root of each of the drilling edges 18a and 18b, which root is located at a position nearer to the shank 11 than the forward center of the drilling edges 18a and 18b. A second flute surface 49 extends axially from the relief surface 48 toward the shank 11.

The outermost ends of the drilling edges 18a and 18b are connected to circular surface 45 of the first reduced-diameter portion 8. The outermost ends of the first reaming edges 19a and 19b are connected to circular surface 46 of the second reduced-diameter portion 9. And the second reaming edges 20a and 20b are connected to circular surface 47 of the third reduced-diameter portion 10. The circular surfaces 46 and 47 respectively have diameters of the same size as one another. A second relief surface 40, a third relief surface 41 and a fourth relief surface 42 are formed at positions behind the circular surfaces 45, 46 and 47 respectively with respect to the rotational direction of the drill to fix the circular surfaces 45, 46 and 47 to be the same length.

When the burnishing drill 1 is rotated in the direction of arrow A as shown in FIG. 1, a workpiece is first drilled by the drilling edges 18a and 18b. The drilled hole is then worked by the first reaming edges 19a and 19b, and the second reaming edges 20a and 20b to provide a reamed hole having a smoother inner wall and an accurate diameter size.

Since the burnishing drill 1 provides a stable rotational axis for the drilling edges 18a and 18b, the first reaming edges 19a and 19b and the second reaming edges 20a and 20b, the stability while cutting can be enhanced. As a result, the oversize of diameter of the finished holes and dispersion of diameter can be reduced, and accuracy in the finished holes can be greatly improved.

Figure 6:
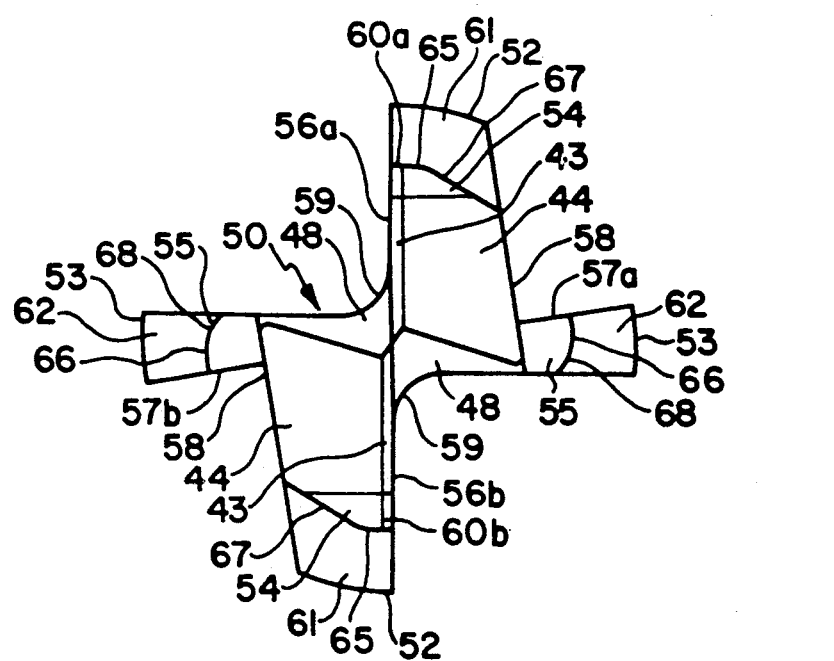
FIG. 6 is a front view illustrating a second embodiment of the invention.
Figure 7:
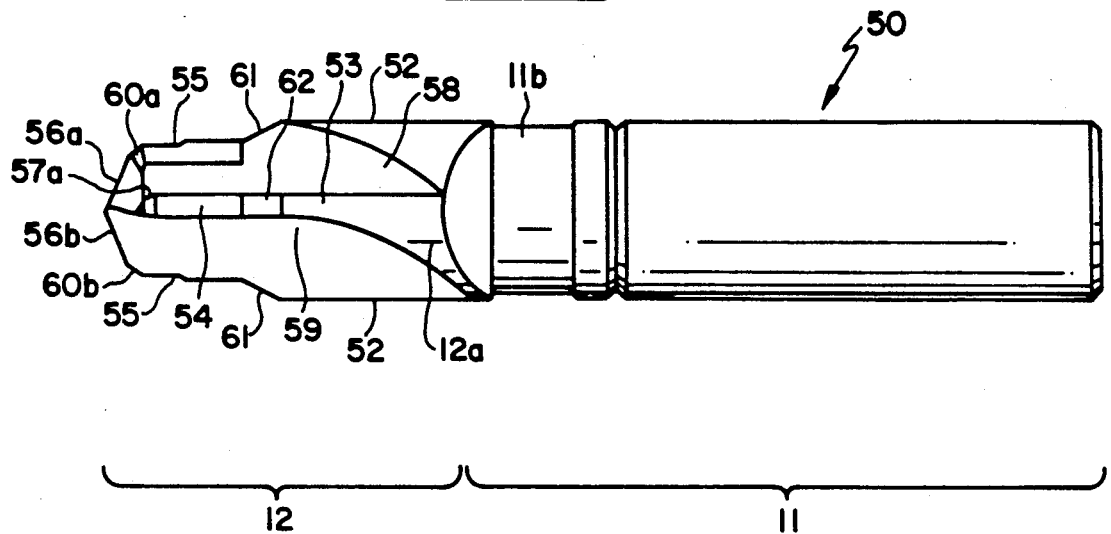
FIG. 7 is a side view illustrating the second embodiment of the invention.
Figure 8:
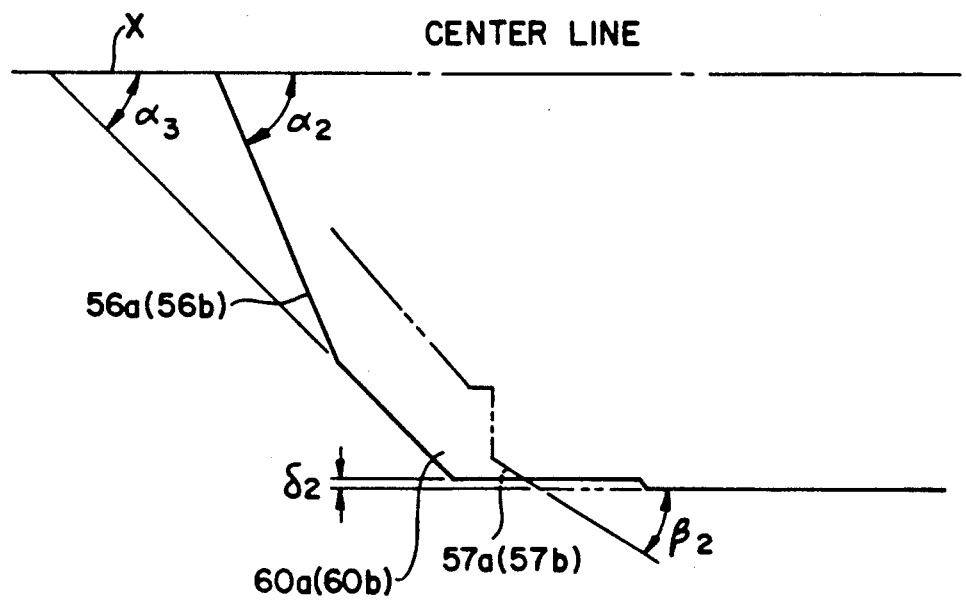
FIG. 8 is a schematic view illustrating the cutting angles of the drilling edges and the reaming edges of the second embodiment of the invention.
Figure 9:
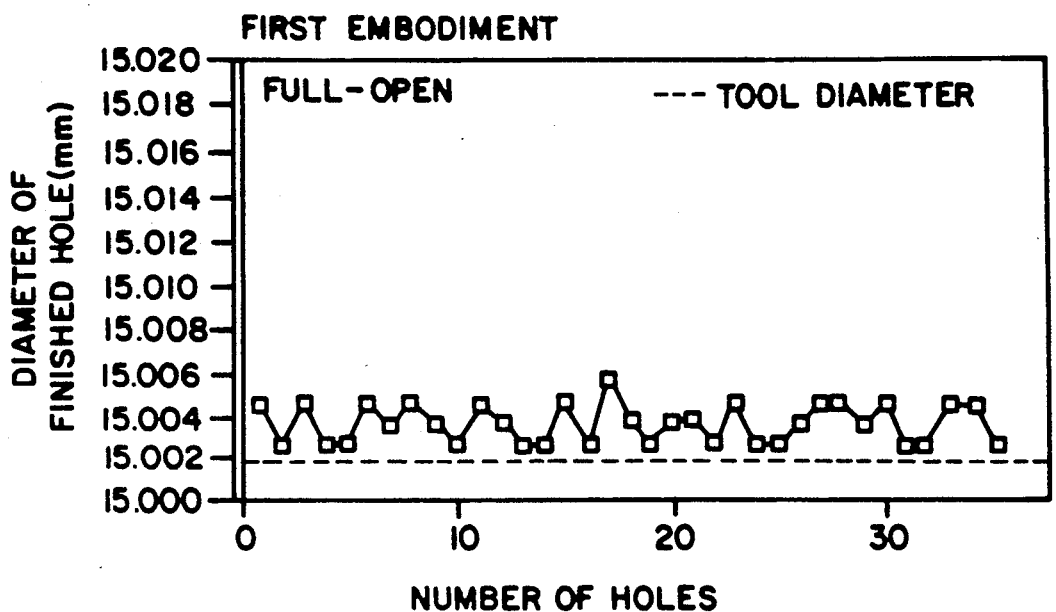
FIG. 9 is a characteristic diagram showing dispersion of diameter of the holes drilled and reamed by the burnishing drill of the first embodiment of the invention.
Figure 10:
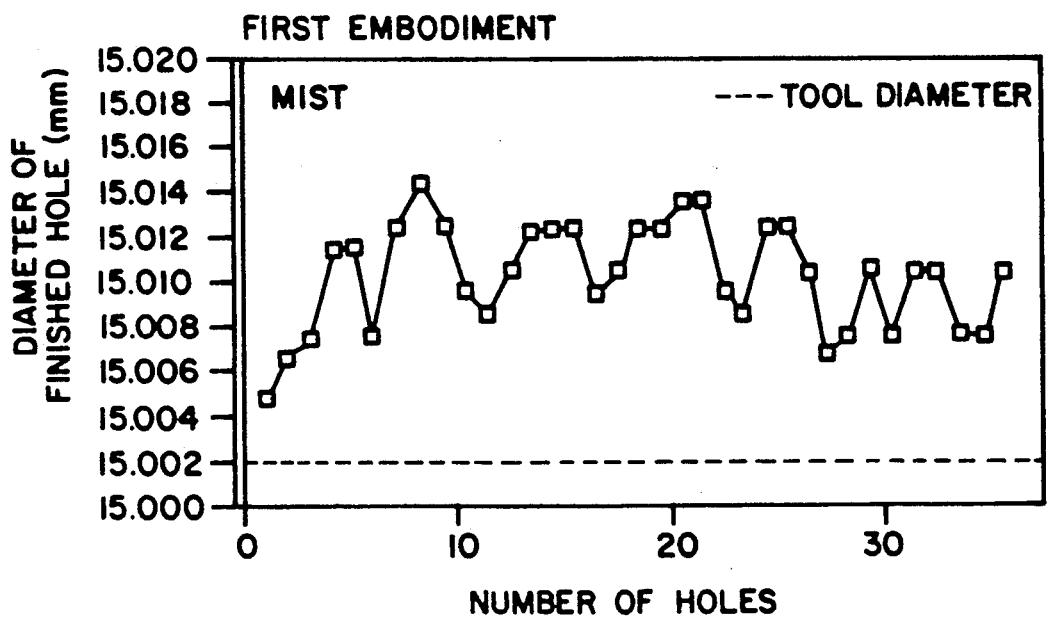
FIG. 10 is a characteristic diagram showing dispersion of diameter of the holes drilled and reamed by the burnishing drill of the first embodiment of the invention.
Figure 11:
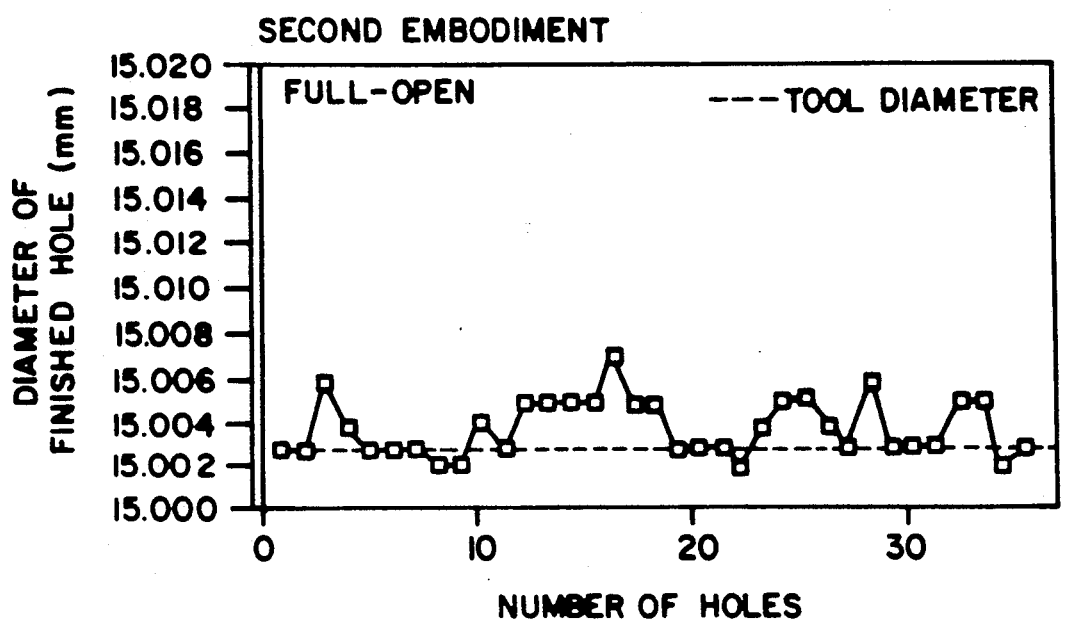
FIG. 11 is a characteristic diagram showing dispersion of diameter of the holes drilled and reamed by the burnishing drill of the second embodiment of the invention.
Figure 12:
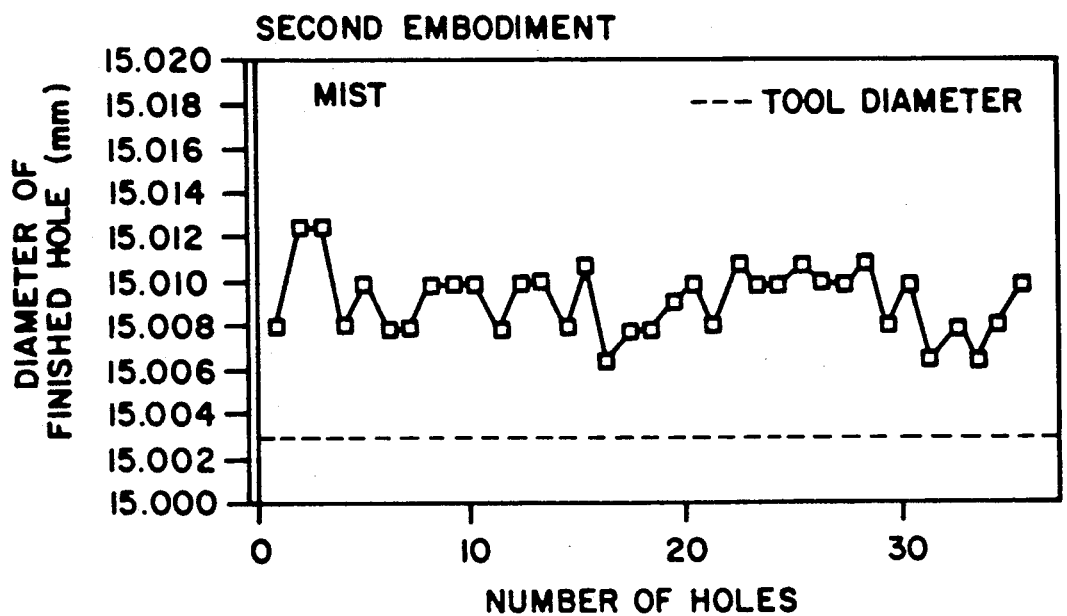
FIG. 12 is a characteristic diagram showing dispersion of diameter of the holes drilled and reamed by the burnishing drill of the second embodiment of the invention.
Figure 13:
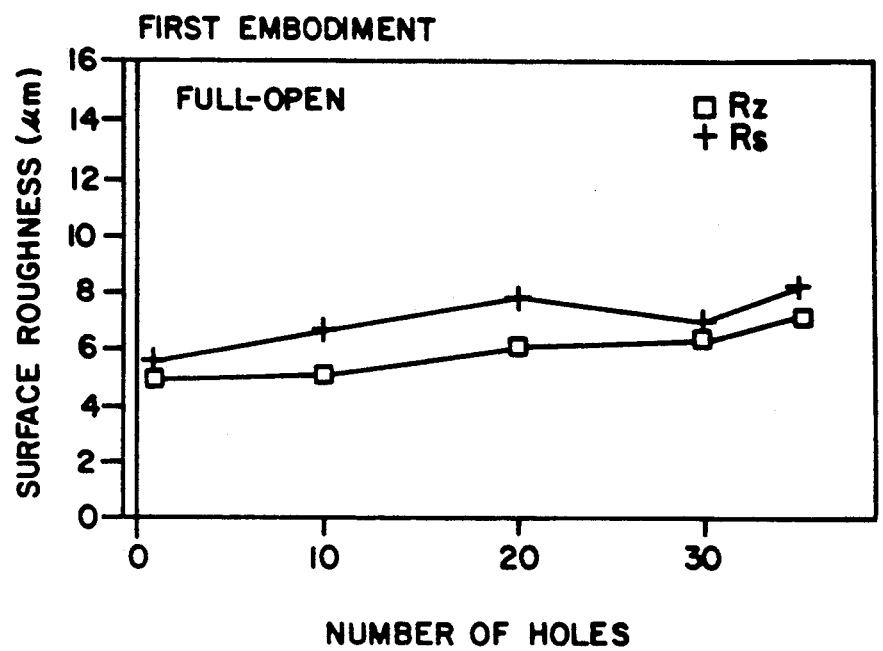
FIG. 13 is a characteristic diagram showing dispersion of surface roughness of the holes drilled and reamed by the burnishing drill of the first embodiment of the invention.
Figure 14:
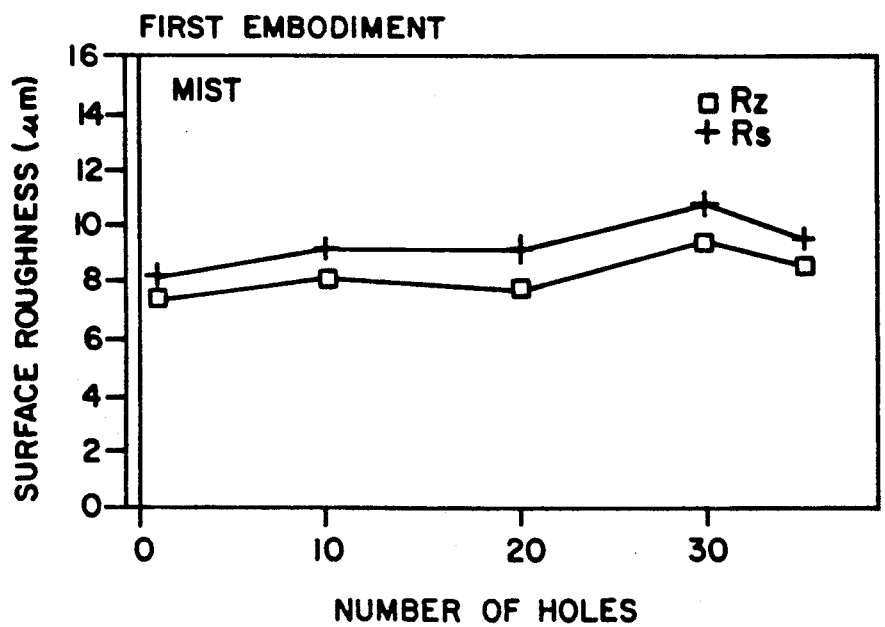
FIG. 14 is a characteristic diagram showing dispersion of surface roughness of the holes drilled and reamed by the burnishing drill of the first embodiment of the invention.
Figure 15:
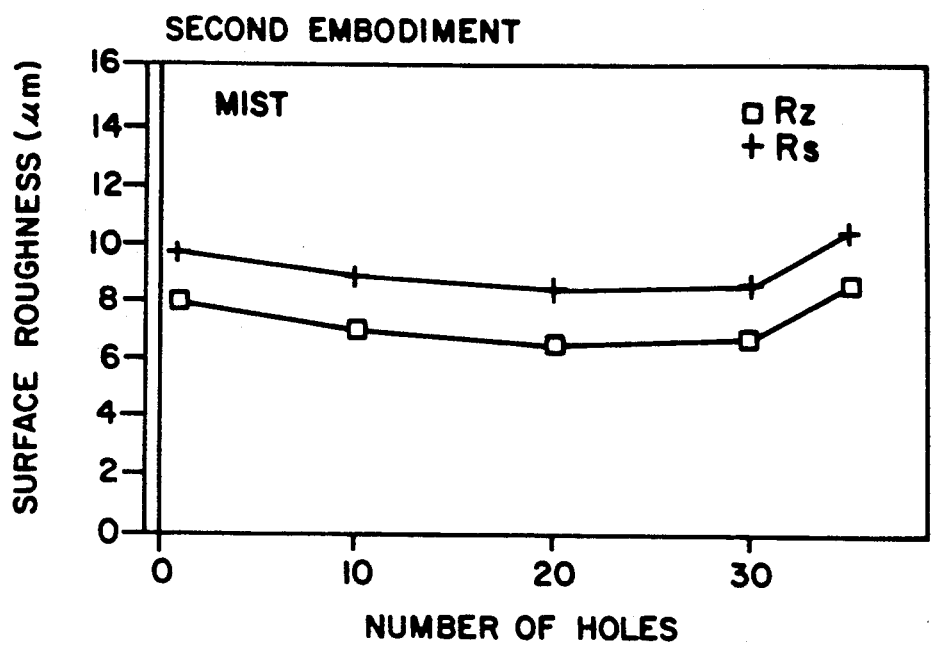
FIG. 15 is a characteristic diagram showing dispersion of surface roughness of the holes drilled and reamed by the burnishing drill of the second embodiment of the invention.
Figure 16:
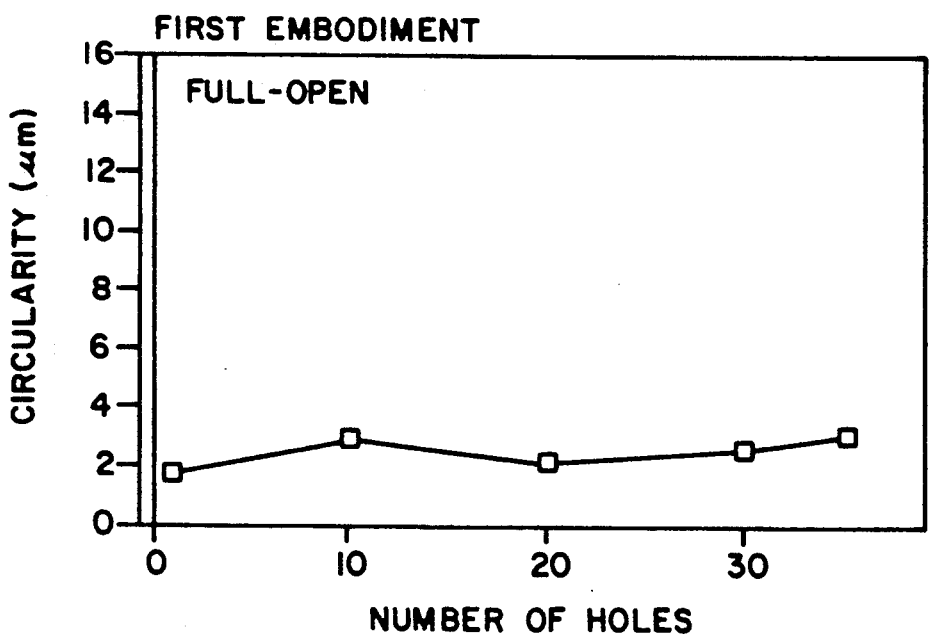
FIG. 16 is a characteristic diagram showing dispersion of circularity of the holes drilled and reamed by the burnishing drill of the first embodiment of the invention.

The second embodiment of the invention is illustrated in FIGS. 6 to 8.

A burnishing drill 50 comprises drilling edges 56a and 56b formed on the foremost end of a first reduced-diameter portion 54 extending from step portion 61 of a first pair of lands 52, and reaming edges 57a and 57b formed on the foremost end of a second reduced-diameter portion 55 extending from step portions 62 on a second pair of lands 53. The first reduced-diameter portion 54 and the second reduced diameter portion 55 are located offset relative to each other by an angle of 90°, between which relief grooves 58 and 59 extend axially. As illustrated in FIG. 6, the outermost ends of the drilling edges 56a and 56b and the reaming edges 57a and 57b are connected with circular surfaces 65 and 66. Relief surfaces 67 and 68 are formed at positions behind the circular surfaces 65 and 66 with respect to the rotational direction of the drill.

As shown in FIG. 8, each of the drilling edges 56a and 56b has two cutting angles $\alpha_2$ and $\alpha_3$. Since the cutting angle $\alpha_3$ is set so as to be smaller than the cutting angle $\alpha_2$, the shoulder portions 60a and 60b of the drilling edges 56a and 56b are strengthened.

The outermost ends of the reaming edges 57a and 57b extend radially outward from a position of the outermost edges of the drilling edges 56a and 56b by a distance $\delta_2$. Each of the reaming edges 57a and 57b has a cutting angle $\beta_2$ of about 20°. It is noted that other parts are substantially similar to those described in connection with the first embodiment. Accordingly, they are indicated by the same reference numerals and are not further explained in relation to the second embodiment.

When the burnishing drill 50 is rotated, a workpiece is drilled by the drilling edges 56a and 56b. The drilled hole is then reamed by the reaming edges 57a and 57b. Since the reaming edges 57a and 57b have a relatively small cutting angle $\beta_2$, the centering property during cutting can be improved and dispersion of diameters of the finished holes can be reduced.

FIGS. 9 to 17 show the results of experimentation carried out to study the diameter, surface roughness and circularity of the holes drilled and reamed by the burnishing drill of the first and the second embodiments. The conditions for the experiments are as follows:
 Tool diameter: 15 mm
 Rotating speed: 637 rpm
 Feeding speed: 0.15 mm/rev.
 Cutting speed: 30 m/min.

In FIGS. 9 to 17, the term "Full-open" refers to the condition in which sufficient amount of water soluble cutting oil was applied during drilling. "Mist" refers to the condition in which relatively small amount of water soluble cutting oil was atomized during drilling.

As understood from FIGS. 9 to 12, the diameters of the finished holes were relatively small in dispersion. Especially when sufficient amount of cutting oil was applied, the differences among the diameters of the finished holes was less than 2 μm.

As also understood from FIGS. 13 to 16, the surface roughness of the finished holes was small in dispersion.

Figure 17:
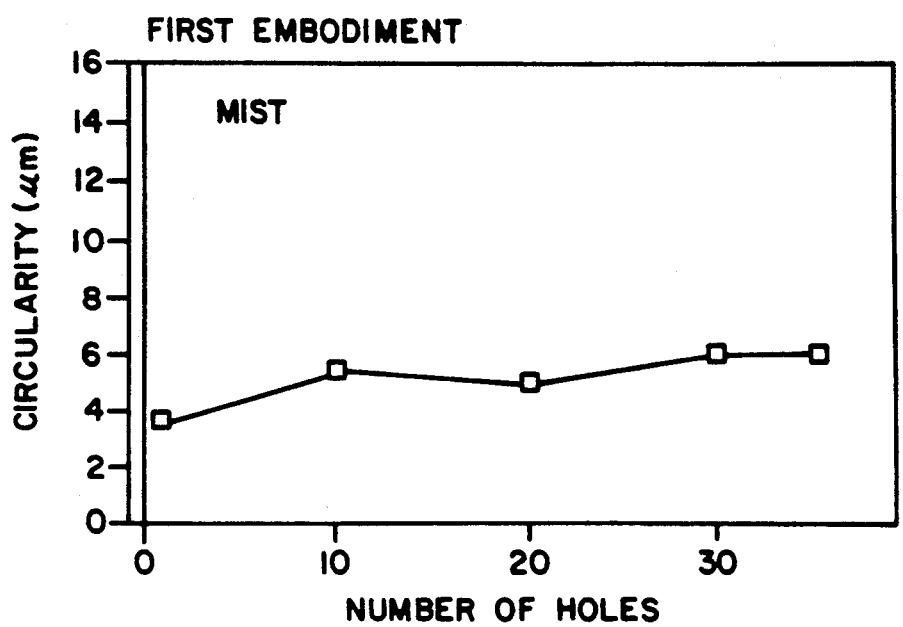
FIG. 17 is a characteristic diagram showing dispersion of circularity of the holes drilled and reamed by the burnishing drill of the first embodiment of the invention.
Figure 18:
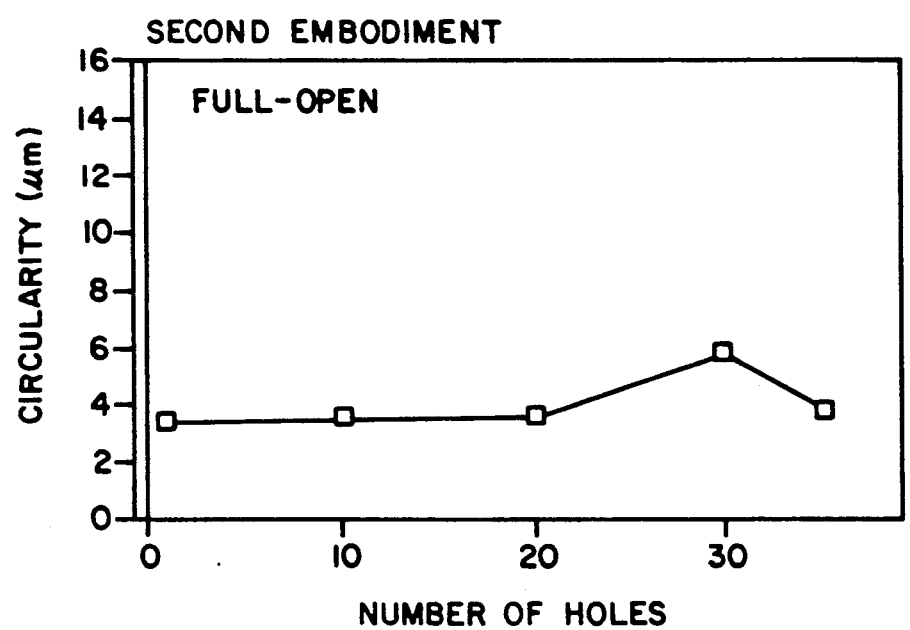
FIG. 18 is a characteristic diagram showing dispersion of circularity of the holes drilled and reamed by the burnishing drill of the second embodiment of the invention.

In addition, as shown in FIGS. 17 to 19, the circularity of the finished holes was also small in dispersion.

As explained above, since the burnishing drill of the invention includes the reaming edges inclined from the foremost end of the drill to the backward at a relatively small cutting angle, the centering and the stabilizing properties can be greatly improved and a drilled and reamed hole can be formed in a reduced period, with increased accuracy.

We claim:

1. A burnishing drill, comprising:
 a shank;
 a drill body having a longitudinal axis and being arranged to be rotated about said longitudinal axis, said drill body being connected at a rearward end thereof to said shank, and including;
 a first pair of cutting edges formed at a leading end of said drill body and extending radially outward with respect to said longitudinal axis as it slants rearwardly toward said shank with a first cutting angle with respect to said longitudinal axis, said longitudinal axis and said first pair of cutting edges lying substantially in a first plane;
 a second pair of cutting edges formed adjacent to said leading end of said body and being disposed in a second plane intersecting the first plane, said second pair of cutting edges having its maximum external diameter being larger than the maximum external diameter of said first pair of cutting edges and extending radially outward with respect to the longitudinal axis as it slants rearwardly toward said shank with a second cutting angle $\beta$ to said longitudinal axis within a range of 5° to 30°; and
 a third pair of cutting edges formed adjacent to said leading end of said drill body at a position axially nearer to said leading end than said second pair of cutting edges and being disposed in a third plane intersecting the first plane, said third pair of cutting edges having its maximum external diameter being larger than the maximum external diameter of said first pair of cutting edges and extending radially outward with respect to the longitudinal axis as it slants rearwardly toward said shank with a third cutting angle $\gamma$ to said longitudinal axis within a range of 5° to 30°.

2. The burnishing drill as set forth in claim 1, wherein:
 said drill body has first axially extending relief grooves for receiving drill chips cut by said first pair of cutting edges at rotationally leading positions relative to said first pair of cutting edges.

3. The burnishing drill as set forth in claim 1, wherein:
 said drill body has second axially extending relief grooves for receiving drill chips cut by said second pair of cutting edges at rotationally leading positions relative to said second pair of cutting edges.

4. The burnishing drill as set forth in claim 1, wherein:
 said drill body has third axially extending relief grooves for receiving drill chips cut by said third pair of cutting edges at rotationally leading positions relative to said third pair of cutting edges.

5. The burnishing drill as set forth in claim 1, wherein:
 said second pair of cutting edges and said third pair of cutting edges respectively have maximum external diameters being the same size as one another.

6. A burnishing drill comprising:
 a shank;
 a drill body having a longitudinal axis and being arranged to be rotated about said longitudinal axis, said drill body being connected at a rearward end thereof to said shank and including:
 a first pair of cutting edges formed at a leading end of said drill body and extending radially outward with respect to said longitudinal axis as it slants rearwardly toward said shank with a first cutting angle with respect to said longitudinal axis, said longitudinal axis and said first pair of cutting edges lying substantially in a first plane;
 a second pair of cutting edges formed adjacent to said leading end of said body and being disposed in a second plane intersecting said first plane, said second pair of cutting edges having its maximum external diameter being larger than a maximum external diameter of said first cutting edges and extending radially outward with respect to said longitudinal axis as it slants rearwardly toward said shank with a second cutting angle $\beta$ to said longitudinal axis within a range of 5° to 30°; and a third pair of cutting edges formed adjacent to said leading end of said drill body and being disposed in a third plane intersecting said first plane, said third pair of cutting edges having its maximum external diameter being larger than the maximum external diameter of said first pair of cutting edges and extending radially outward with respect to the longitudinal axis as it slants rearwardly toward said shank with a third cutting angle $\gamma$ to said longitudinal axis within a range of 5° to 30°;

wherein said third pair of cutting edges have a maximum external diameter which is larger than the maximum external diameter of said second pair of cutting edges.

7. A burnishing drill comprising:

a shank;

a drill body having a longitudinal axis and being arranged to be rotated about said longitudinal axis, said drill body being connected at a rearward end thereof to said shank and including:

a first pair of cutting edges formed at a leading end of said drill body and extending radially outward with respect to said longitudinal axis as it slants rearwardly toward said shank with a first cutting angle with respect to said longitudinal axis, said longitudinal axis and said first pair of cutting edges lying substantially in a first plane;

a second pair of cutting edges formed adjacent to said leading end of said body and being disposed in a second plane intersecting said first plane, said second pair of cutting edges having its maximum external diameter being large than a maximum external diameter of said first cutting edges and extending radially outward with respect to said longitudinal axis as it slants rearwardly toward said shank with a second cutting angle $\beta$ to said longitudinal axis within a range of 5° to 30°; and a third pair of cutting edges formed adjacent to said leading end of said drill body and being disposed in a third plane intersecting said first plane, said third pair of cutting edges having its maximum external diameter being larger than the maximum external diameter of said first pair of cutting edges and extending radially outward with respect to the longitudinal axis as it slants rearwardly toward said shank with a third cutting angle $\gamma$ to said longitudinal axis within a range of 5° to 30°;

wherein said first pair, said second pair and said third pair of cutting edges respectively have maximum external diameters which are smaller than the maximum external diameter of said drill body.

8. A burnishing drill, comprising:

a shank;

a drill body having a longitudinal axis and being arranged to be rotated about said longitudinal axis, said drill body being connected to said shank and including:

a first pair of cutting edges being formed at a leading end of said drill body and extending radially outward with respect to said longitudinal axis as it slants rearwardly toward said shank, said first pair of cutting edges having first and second portions, said first portion inclined at first a cutting angle $\alpha_2$ with respect to said longitudinal axis and said second portion inclined at a cutting angle $\alpha_3$ with respect to said longitudinal axis;

wherein said second portion is disposed radially outward of said first portion, said cutting angle $\alpha_3$ is smaller than said cutting angle $\alpha_2$, and said longitudinal axis and said first pair of cutting edges lie substantially in a first plane; and a second pair of cutting edges being formed adjacent to said leading end of said drill body and disposed in a plane intersecting the first plane, said second pair of cutting edges having its maximum external diameter being larger than the maximum external diameter of said first cutting edges and extending radially outward from the longitudinal axis as it slants rearwardly toward said shank with a cutting angle $\beta_2$ to said longitudinal axis within a range of 5° to 30°.

9. The burnishing drill as set forth in claim 8, wherein:

said drill body has first axially extending relief grooves for receiving drill chips cut by said first pair of cutting edges at rotationally leading position with respect to said first pair of cutting edges.

10. The burnishing drill as set forth in claim 8, wherein:

said drill body has second axially extending relief grooves for receiving drill chips cut by said second pair of cutting edges at rotationally leading positions relative to said first pair of cutting edges.

11. The burnishing drill as set forth in claim 8, wherein:

said first pair of second pair of cutting edges respectively have maximum external diameters which are smaller than a maximum external diameter of said drill body.

* * * * *